(12) United States Patent
Beyer et al.

(10) Patent No.: US 8,959,386 B2
(45) Date of Patent: Feb. 17, 2015

(54) NETWORK AND EXPANSION UNIT AND METHOD FOR OPERATING A NETWORK

(75) Inventors: Ralf Beyer, Moerendorf (DE); Harald Karl, Fuerth (DE); Michael Wilding, Ditzingen (DE)

(73) Assignee: Siemens Aktiengesellschaft, Munich (DE)

( * ) Notice: Subject to any disclaimer, the term of this patent is extended or adjusted under 35 U.S.C. 154(b) by 146 days.

(21) Appl. No.: 13/699,786

(22) PCT Filed: May 23, 2011

(86) PCT No.: PCT/EP2011/058316
§ 371 (c)(1),
(2), (4) Date: Nov. 26, 2012

(87) PCT Pub. No.: WO2011/147759
PCT Pub. Date: Dec. 1, 2011

(65) Prior Publication Data
US 2013/0138996 A1 May 30, 2013

(30) Foreign Application Priority Data

May 26, 2010 (DE) .......................... 10 2010 029 301

(51) Int. Cl.
| | |
|---|---|
| *G06F 11/00* | (2006.01) |
| *G06F 11/20* | (2006.01) |
| *H04L 12/46* | (2006.01) |
| *H04L 12/26* | (2006.01) |
| *H04L 12/939* | (2013.01) |
| *H04L 12/931* | (2013.01) |

(52) U.S. Cl.
CPC ............ *G06F 11/20* (2013.01); *H04L 12/4625* (2013.01); *H04L 43/0811* (2013.01); *H04L 43/10* (2013.01); *H04L 49/552* (2013.01); *H04L 49/557* (2013.01); *H04L 49/351* (2013.01); *Y04S 40/168* (2013.01)
USPC .............................................. 714/4.2; 714/43

(58) Field of Classification Search
USPC ............................................. 714/4.2, 43, 57
See application file for complete search history.

(56) References Cited

U.S. PATENT DOCUMENTS

| | | | |
|---|---|---|---|
| 5,307,353 A * | 4/1994 | Yamashita et al. ............. | 714/4.1 |
| 6,870,814 B1 * | 3/2005 | Bunton et al. ................. | 370/245 |
| 7,002,941 B1 | 2/2006 | Treadaway et al. | |
| 7,221,928 B2 | 5/2007 | Laird et al. | |
| 8,032,796 B2 * | 10/2011 | Ozaki et al. ..................... | 714/43 |
| 8,451,712 B2 * | 5/2013 | Johri et al. .................... | 370/216 |
| 2005/0192004 A1 | 9/2005 | Witzel et al. | |

(Continued)

FOREIGN PATENT DOCUMENTS

| | | |
|---|---|---|
| CN | 2711993 Y | 7/2005 |
| RU | 2313194 C2 | 12/2007 |

(Continued)

*Primary Examiner* — Marc Duncan
(74) *Attorney, Agent, or Firm* — Laurence A. Greenberg; Werner H. Stemer; Ralph E. Locher (57) ABSTRACT

A network, in particular an Ethernet network, contains as network elements at least two network components that are interconnected by a network transmission line. Accordingly, at least one expansion unit having two external ports is disposed in the network line for extending the scope thereof, wherein the expansion unit forwards a failure of the network transmission line at one of the ports thereof to a port of the next subsequent network element.

22 Claims, 6 Drawing Sheets

(56) References Cited

U.S. PATENT DOCUMENTS

| | | | |
|---|---|---|---|
| 2005/0276214 A1* | 12/2005 | Phelan et al. | 370/216 |
| 2006/0126503 A1* | 6/2006 | Huck et al. | 370/225 |
| 2006/0259984 A1 | 11/2006 | Juneau | |
| 2007/0010132 A1* | 1/2007 | Nelson et al. | 439/577 |
| 2007/0097857 A1* | 5/2007 | Zhai | 370/218 |
| 2007/0275710 A1 | 11/2007 | Mayer et al. | |
| 2009/0136233 A1 | 5/2009 | Fukashiro | |
| 2009/0303883 A1* | 12/2009 | Kucharczyk et al. | 370/241 |
| 2010/0238795 A1* | 9/2010 | Boutros et al. | 370/219 |

FOREIGN PATENT DOCUMENTS

| | | |
|---|---|---|
| RU | 2386219 C2 | 4/2010 |
| WO | 9962229 A1 | 12/1999 |

\* cited by examiner

NETWORK AND EXPANSION UNIT AND METHOD FOR OPERATING A NETWORK

BACKGROUND OF THE INVENTION

Field of the Invention

The invention relates to a network, in particular an Ethernet network. The network comprises as network elements at least two network components that are interconnected by means of a network transmission line. The invention further relates to an expansion unit for extending the scope of the network transmission line and a method for operating a network.

As a result of the increasing use of network technologies from the field of office communications, for example Ethernet, Token Ring, ATM and others, the inexpensive networking of terminals by means of such network technologies is increasingly gaining prominence, including in the field of industrial automation.

In the case of the network technologies used in office communications, the networking normally takes place via nodal points (so-called hubs, or switches), from which point-to-point connections go out in a star-shaped configuration to the individual terminals. This is disadvantageous for applications in the field of industry, which often include linear structures over long distances of over 100 m.

In various applications with lengths of over 100 m it is not possible to use a glass fiber as a network or transmission line (in network terminology, also called a link or path). A reason for this can be connectors within the network transmission line, possibly even with the risk of contamination. Another reason for the non-use of glass fibers is the increasing use of so-called hybrid cables, i.e. the network transmission line is integrated, together with other lines, within a shared cable. These hybrid cables can have output connectors and breakers between the end points of the Ethernet transmission. The disadvantage of glass fiber cables here is that the connection between two glass fibers is sensitive, susceptible to attenuation, and difficult to create in situ.

An application in which the use of glass fibers is also not practicable is the Ethernet Train Bus. It connects network components of a cross-train Ethernet network in which the network components are disposed several 100 m apart from one another. The network transmission line is often a constituent part of a hybrid cable and fed via several plug-in connectors.

When so-called twisted pair cables are used, the problems of attenuation and of loss of signal can only be resolved by an Ethernet repeater or Ethernet switch, which regenerates the transmission signal, being built in no later than after 100 m. Because of their simple construction, repeaters are simple to install, inexpensive and need no parameterization or configuration.

Repeaters become problematical if redundancy is required for the Ethernet transmission medium, the network transmission line. In such cases, redundancy protocols such as RSTP (rapid spanning tree protocol) or MRP (media redundancy protocol) are used. The basic principle common to all protocols is that they only activate a sufficient number of all the available network connections for all network users to form a topological tree, i.e. for there to be precisely one transmission path between any two network users on the network. All other available redundant network connections are in an inactive or passive mode, i.e. there is no transmission of data between them. Only an exchange of redundancy protocol information takes place via these passive ports.

The network components or network elements (such as Ethernet switches, network repeaters and network transmission lines) that are used in the case of a redundant network must support the corresponding redundancy protocol. In order to be able to switch to other network connections as quickly as possible in the event that an active network connection is lost, failure of the network transmission line (also called the Ethernet link) is detected. Following the failure of the network transmission line the Ethernet switches reconfigure the network from scratch, so that a topological tree is produced again. In parallel with the reconfiguration of the network transmission line the integrity of the network connections continues to be monitored through the transmission of cyclical telegrams. However, as these are only transmitted approximately every 100 ms, a rapid switchover is not possible to achieve on the basis of such telegrams, which thus only serve as an emergency solution in the event that data transmission is not possible despite there being an active network connection (e.g. a fault in an Ethernet switch ASIC).

Where Ethernet repeaters or Ethernet switches are used, the problem exists that, in the event that the network transmission line or the link to a port of one of the network components fails, the network transmission line at the other ports of the network components remains active, i.e. the network connection of the failed network transmission line is not forwarded. This prevents rapid signaling of the failure of the network transmission line to the next network component with redundancy functionality, thus preventing a short switching time. The only solution is the use of a network component with redundancy functionality as the Ethernet switch. This is, however, expensive, because of the large number of redundant components. In addition, parameterization and configuration are very labor-intensive. Also, the number of network components in a network with redundancy functionality is limited by the standards governing redundancy protocols.

U.S. Pat. No. 6,870,814 B1 discloses a network that contains an expansion unit for extending scope by means of which link failures in the network are identified and information on identified link failures can be transmitted into the network.

A method for protecting against faults on the transmission path in a communication network is known from U.S. Pat. No. 7,126,908 B1. The network consists of nodes and network transmission lines. The nodes can interconnect a multiplicity of optical connection lines.

U.S. patent disclosure No. 2009/0136233 A1 discloses an optical network containing at least one expansion unit for extending the scope thereof, which forwards a failure of the network transmission line at its external port to a monitoring and control network.

International patent disclosure WO 99/62229 A1 discloses a terminal for a wireless connection in a telecommunications network. The terminal contains a forwarding device for receiving Ethernet data packets from a computer network and for forwarding the Ethernet data packets and a transmission device linked to the forwarding device for receiving the Ethernet data packets from the forwarding device and transferring the Ethernet data package over the wireless connection.

BRIEF SUMMARY OF THE INVENTION

The object underlying the invention is therefore further to develop a class-specific network and a class-specific method for operating a network, in such a way as to rapidly and securely enable a simpler and non labor-intensive switchover in the event of the failure of one of the network transmission lines, including where transmission distances are long. A further object of the invention is to specify an expansion unit for network transmission lines of a network that enables a rapid switchover within the network in the event of the failure of a network transmission line.

According to the invention, the object is achieved through the features specified in the claims with regard to the network, through the features specified in the claims with regard to the expansion unit and through the features specified in the claims with regard to the method for operating a network.

Advantageous developments of the invention are the subject matter of the subclaims.

A network, in particular an Ethernet network, comprises as network elements at least two network components that are interconnected by means of a network transmission line. According to the invention, at least one expansion unit having two external ports is disposed in the network transmission line for extending the scope thereof, wherein the expansion unit detects a failure of the network transmission line at one of its ports and forwards it to a port of the next subsequent network element, in particular of the next subsequent expansion unit or network component.

The forwarding of the failure of the network transmission line continues until the signal is received at a port of a network element with a redundancy function. Such forwarding of the failure of the network transmission line, or of the link, at the port of the expansion unit to the port of the next subsequent network element, e.g. a repeater, another expansion unit, a network component such as a terminal, or to a network element with a redundancy function, enables a rapid switchover of redundancy protocols. The forwarding of the failure of the network transmission line happens irrespective of the redundancy protocol used within the network. As all redundancy protocols automatically initiate a switchover following a failure of a network transmission line, labor-intensive parameterization, configuration and identification of redundancy protocols are no longer necessary.

Another advantage resides in the fact that, because of the simple construction of the expansion unit (also known as the link extender) without redundancy function, and irrespective of the redundancy protocol used, the number of network elements with a redundancy function is not increased.

In the interests of greater clarity, failure of the network transmission line or network connection will be referred to hereafter as link failure.

For the purposes of simple production of the expansion unit and its integration into the network, the external ports of the expansion unit are connected to one another by means of a hard-wired connection circuit. This makes it possible to use expansion units in the network, even if they are few in number.

For the purposes of simple parameterization and particularly flexible and universal port connection circuits, the expansion unit comprises an electronically programmable circuit, for example, a so-called field programmable gate array (FPGA) or an electronically programmable logic device (EPLD) or a switch coupling element.

In one possible embodiment for the forwarding of the link failure in the event of failure of the network transmission line at one of the ports of the expansion unit, the other port of the expansion unit is deactivated. As a result, the link failure continues to be forwarded from one expansion unit to the next; for example, where distances of several kilometers are involved, to the next network component or the next terminal. Such simple forwarding of the link failure has the advantage that it can be executed irrespective of the redundancy protocol used in the network, whether the network components involved have a redundancy function or not, and complies with the standards. A delay caused by the detection of a link failure can be disregarded here.

Preferably, the other port of the expansion unit can be deactivated in such a way that a physical layer device of the failed port is switched off or into a sleep mode, or the network transmission line is switched over by means of the physical layer device.

Alternatively, the expansion unit generates at least one warning telegram when there is a link failure at one of its ports, and transmits the telegram to ports of downstream or receiving network elements. All other network transmission lines or links can be retained during this process. This means that the warning telegram is only transmitted by the expansion unit or network element that detected the link failure.

Expediently, in the event of a link failure being detected in one of its ports, the expansion unit switches the other port in the opposite direction, into a predefined fault mode, and generates at least one warning telegram, which it sends to ports of network elements that are downstream from this port in the opposite direction. As a result, the link failure is forwarded in the opposite direction and reported, including to network elements.

Expediently, in order to identify the position of the fault, i.e. the beginning of the link failure, the network element receiving a warning telegram generates at least one warning telegram with fault position identification and sends it to ports of downstream or receiving network elements. Fault position identification is achieved in a simple manner, for example by means of a distance meter. The warning telegram comprises a meter. Starting with the network element or the expansion unit that was the first to identify a link failure, the reading on the meter of every other receiving network element is raised by, for example, the value of one. This enables the network element receiving the warning telegram with fault position identification quickly and accurately to determine the location or position of the fault among the expansion units.

Expediently, the network is configured in such a way that either the other port of the expansion unit is deactivated or the warning telegrams are transmitted. In this case, the expansion unit is configured in such a way that one of the two functions, port deactivation or sending of warning telegrams, can be selected by means of a simple switching function.

In a simple embodiment of the expansion unit, the expansion unit can be supplied with electrical energy via the network transmission line. Alternatively or in addition, the expansion unit can be supplied with electrical energy by the terminal itself.

The expansion unit according to the invention for extending the scope of a network transmission line in a network comprises at least two external ports that can be interconnected via a hard-wired connection circuit in such a way that a failure of the network transmission line at one of the ports can be detected and transmitted. Such an expansion unit according to the invention enables simple implementation of several of these expansion units in a future or existing network in order to extend the scope of network connections from several hundred meters to several kilometers.

For the purposes of galvanic separation, the expansion unit comprises, on the input side and the output side, a separating element, for example a transformer, for each data line.

In order to realize the option of forwarding a link failure by sending warning telegrams, the electronically programmable circuit, e.g. an FPGA, comprises a telegram generator and a controller for each data line. When a link failure is identified, warning telegrams, with or without fault position identification, are automatically generated by means of the telegram generator and transmitted via the data line. The controller serves to identify the link failure and control the telegram generator and the transmission of telegrams, as well as the switching over of the network transmission line, in particular of its data lines.

In an alternative embodiment, the expansion unit comprises a switch coupling element (switch ASIC) with a microcontroller. This controlled switch ASIC solution of the expansion unit performs, as with the FPGA-PHY solution for the forwarding of a link failure at one of the ports of the expansion unit, the deactivation of the other port of the expansion unit or the generation and transmission of warning telegrams.

Expediently, a bypass line for switching over the network transmission line in the event of a power outage and/or a faulty component of the expansion unit is provided on the input side and the output side, parallel with each of the data lines of the network transmission line. The switchover is achieved through activation of a switching element by means of the controller. In order that the failure of one of the components of the expansion unit can be identified, the expansion unit comprises at least one fault identification device. In each of the data lines, the switching element is disposed before the separating element on the input side and after the separating element on the output side.

As a result, network availability is increased, as continued operation of the network is made possible. The bypass switch is optional, but is useful with a linear structure.

Exemplary embodiments of the invention are described in more detail below with the aid of drawings in the form of schematic block diagrams, parts of which are exploded, and of which:

DESCRIPTION OF THE INVENTION

Parts, data and functions that are the same as each other have in all the figures been given the same reference signs throughout.

Figure 1:
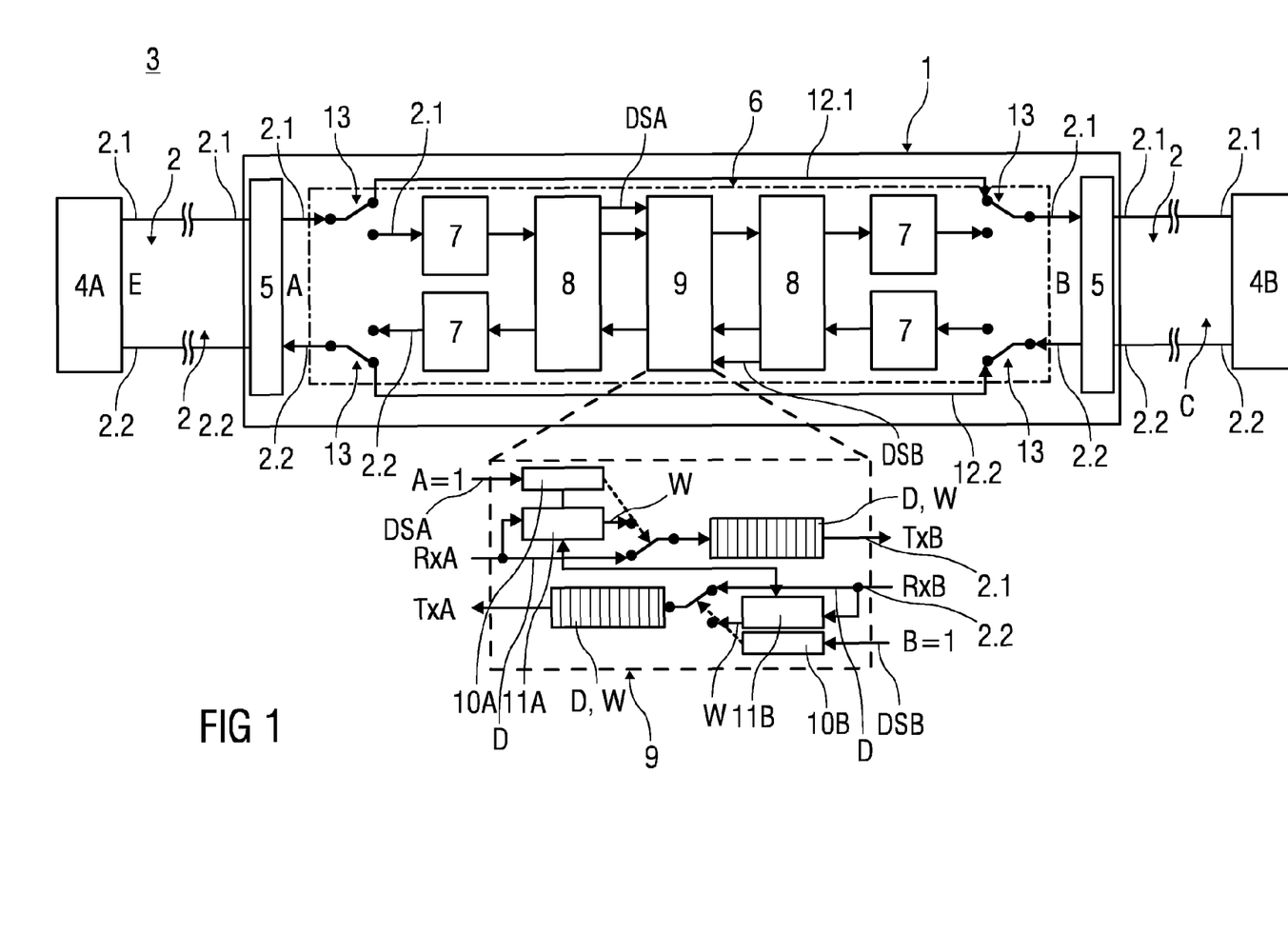
FIG. 1 shows an expansion unit for a network transmission line for extending scope in a network without a link failure.

FIG. 1 is a schematic block diagram showing an expansion unit 1 for a network transmission line 2. The expansion unit 1 serves to extend scope within a network 3.

The network 3 can be an Ethernet network or another standard network. In network 3, network components 4A and 4B such as, for example, individual terminals, are interconnected via the network transmission line 2 comprising data lines 2.1 and 2.2 (also called links). Network 3 can have a linear structure or a ring-shaped structure with a multiplicity of network components 4A, 4B connected via the data lines 2.1 and 2.2.

The network transmission line 2 can be extended on individual occasions by means of the expansion unit 1, in particular by the maximum transmission range of the network, e.g. by 100 m in an Ethernet network, without loss of transmission or loss due to attenuation, or signal loss. In particular, any desired distance is made possible by means of a cascading connection of several expansion units 1 in a network transmission line 2.

As a result of its simple construction, described below, the expansion unit 1 can subsequently be incorporated into network transmission lines 2 of existing networks 3.

The expansion unit 1 comprises two external ports A and B for the connection of the network transmission line 2, which is connected to ports A or B by means of conventional connectors. The expansion unit 1 also comprises an internal port, not shown in detail.

In the exemplary embodiment, the data lines 2.1 and 2.2 and the network components 4A, 4B are configured in such a way that their data traffic runs in the opposite direction. This means that a data link between the network component 4A connected at port A and the network component 4B connected at port B is created by means of the data line 2.1. A data link in the opposite direction is created by means of data line 2.2, i.e. from the network component 4B connected at port B to the network component 4A connected at port A.

In order to create a data link between ports A and B within the expansion unit 1 a hard-wired connection circuit 6 is provided.

For the purposes of galvanic separation, the expansion unit 1, in particular the connection circuit 6, comprises, for example, transformers as separating elements 7 at the ports of each of the data lines 2.1 and 2.2.

In a first embodiment, the data lines 2.1 and 2.2 are connected via so-called physical layer devices 8 (also called PHY for short) to the external ports A and B by means of the connection circuit 6 in order to create a media-independent interface between the external ports A and B. The physical layer devices serve to transmit data, in order to activate, deactivate and maintain physical data links between the network components 4A and 4B and to transmit data.

An electronically programmable circuit 9 is connected between the physical layer devices 8 in the connection circuit 6.

The electronically programmable circuit 9 is shown in more detail in FIG. 1, in the form of an exploded diagram with a dashed outline.

The electronically programmable switch 9 can be embodied as a so-called field programmable gate array (FPGA) or an electronically programmable logic device (EPLD). Alternatively, the circuit 9 can, however, also be embodied as a hard-programmed integrated circuit, in particular as an ASIC with an additional microcontroller. Such an electronically programmable circuit 9 offers simple parameterization, flexible and universal configuration and control of the data traffic and simple monitoring of data, ports and links.

The electronically programmable circuit 9 is embodied in such a way that it detects a failure of the network transmission line 2, also called a link failure, at one of its external ports A or B, and forwards it to an external port B or A of the next subsequent network element, e.g. the network component 4B or 4A.

To this end, the electronically programmable circuit 9 comprises, for each of the ports A and B, a controller 10A or 10B and a telegram generator 11A or 11B for generating telegrams D. The controllers 10A and 10B each monitor the status of the data link between Port A and Port B by means of an active or inactive data signal DSA or DSB.

In the exemplary embodiment according to FIG. 1 the data link between port A and port B is active, i.e. the data signals DSA and DSB of the physical layer device 8 have the status "A=1" and "B=1" respectively. The electronically programmable circuit 9 transmits the data telegrams D on the data lines 2.1 and 2.2 after a delay, as the electronically programmable circuit 9 acts as a buffer and equalizes slight variances in clock frequencies in the two physical layer devices 8. The delay is of approximately a few 100 ns.

Depending on how the data is transmitted—via layer 1 or layer 2 of the ISO/OSI reference model—at each transmission, either a data telegram D with a newly generated preamble is sent or received databytes are forwarded on layer 1. Neither the data telegrams D nor the forwarded databytes are checked. In particular, no cyclical redundancy check (CRC) is carried out.

In the event that the power supply of the expansion unit 1 fails or that a fault is identified in one of the components, e.g. the circuit 9 of the expansion unit 1, the incoming data lines 2.1 and 2.2 of the network line 2 are switched over. To this end, the expansion unit 1 comprises two bypass lines 12.1 and 12.2, parallel with the connection circuit 6. For switching the data lines 2.1 and 2.2 over to the bypass lines 12.1 and 12.2 respectively, the expansion unit 1 comprises two switching elements 13, e.g. relay contacts. When a power outage or a component fault is identified, these relay contacts are activated so that the data lines 2.1 and 2.2 are switched over to the bypass lines 12.1 and 12.2 respectively.

Figure 2:
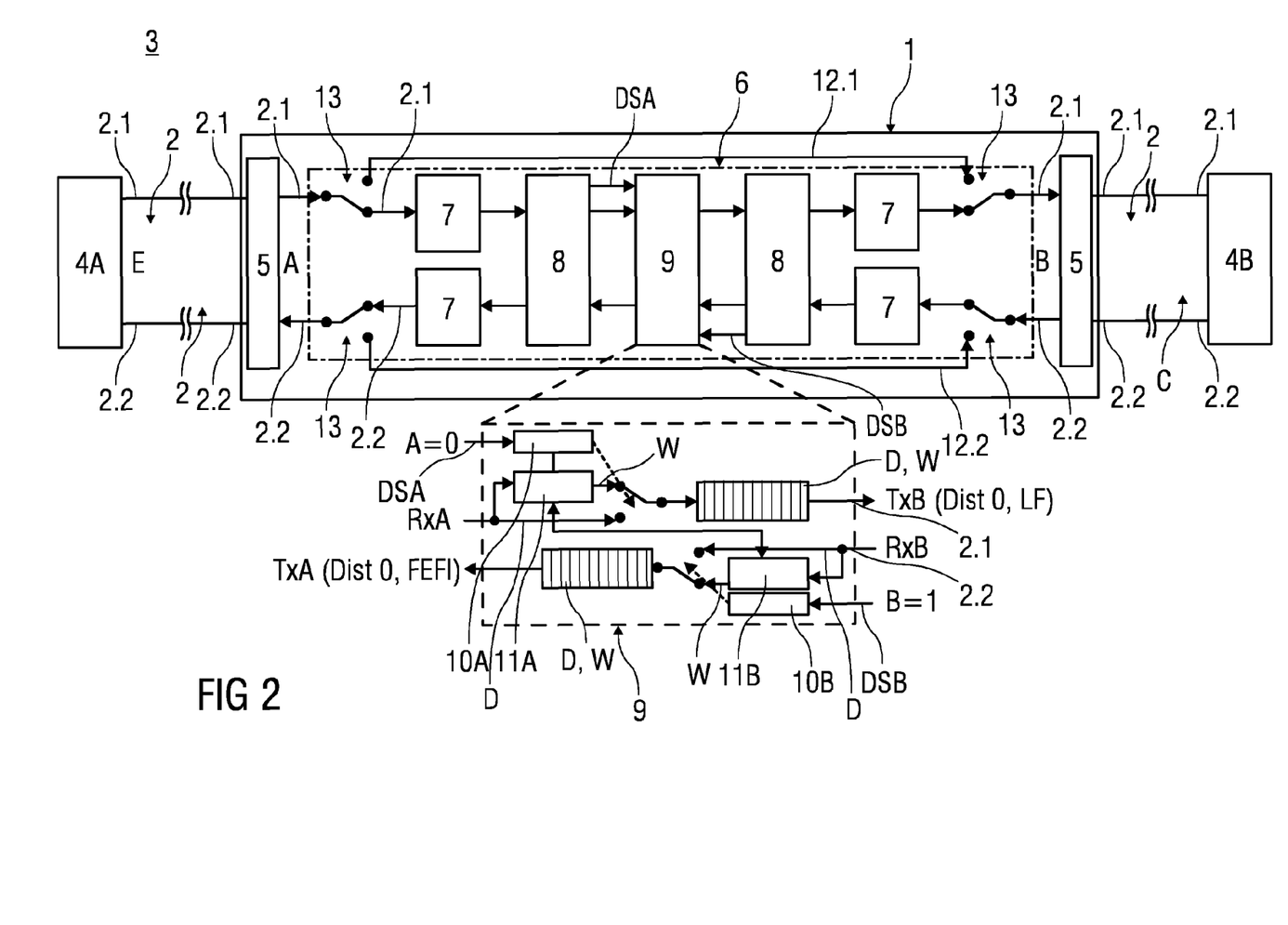
FIG. 2 shows the expansion unit according to FIG. 1 with a link failure at one of the ports.

FIG. 2 is a schematic block diagram showing the expansion unit 1 according to FIG. 1 with a link failure at port A. The data signal DSA of the physical layer device 8 of port A shows the status "A=0". The controller 10A switches the expansion unit 1 into a fault mode, the so-called panic mode.

Depending on the type and configuration of the panic mode, one of the following two steps can be taken:
  Deactivation of the other port B of the expansion unit 1 or
  Activation and/or control of the telegram generator 11A so that warning telegrams W (also called panic messages) are cyclically generated instead of the data telegrams D.

The link failure at the ports A and B of the downstream network component 4A or 4B is identified with the aid of the deactivated port B or the receipt of the warning telegrams W. If several expansion units 1 are integrated into the network transmission line 2, the delay in identifying and reporting, or forwarding, a link failure corresponds to the delay by the particular expansion unit 1.

More precisely, in order to deactivate the port B, for example, the relevant physical layer device 8 of the port A of the link failure is switched off or put into a sleep mode.

Such forwarding of the link failure to the port A of the next network component 4A by deactivation of the other external port B happens irrespective of the data and/or redundancy protocol of Network 3. The disadvantage of this is that it is not possible to identify the point of origin or location of the fault causing the link failure.

For the purposes of identifying the point of origin of the link failure, the invention provides for the warning telegrams W to be generated and transmitted instead of the other external port B being deactivated.

By means of the generated warning telegrams W, which are transmitted from port A to port B or from port B to port A of the next subsequent network component 4A or 4B, it is possible to transmit a position identification signal in order to identify the point of origin. To this end, by way of position identification, the warning telegrams W include, for example, distance data "Dist 0" for "distance equals 0". This means that the link failure occurred for the first time at expansion unit 1.

For fault identification, the warning message W includes the fault reporting data "LF" to identify a link failure fault.

In order also to report the link failure in the opposite direction of the data link, i.e. from port B to port A, the controller 10B of port B also goes into fault mode, and generates the warning telegrams W with the distance data "Dist 0" and the fault reporting data "FEFI".

The warning telegrams W are generated both by the controller 10A and the controller 10B, for example as Ethernet telegrams with IP Multicast Ethernet addresses (e.g. 01-80-C2-xx.xx.xx) as the destination address. In network 3, each expansion unit 1 has its own Ethernet address with source address. IP Multicast telegrams generated in this way are not forwarded by network elements embodied as switches.

Figure 3:
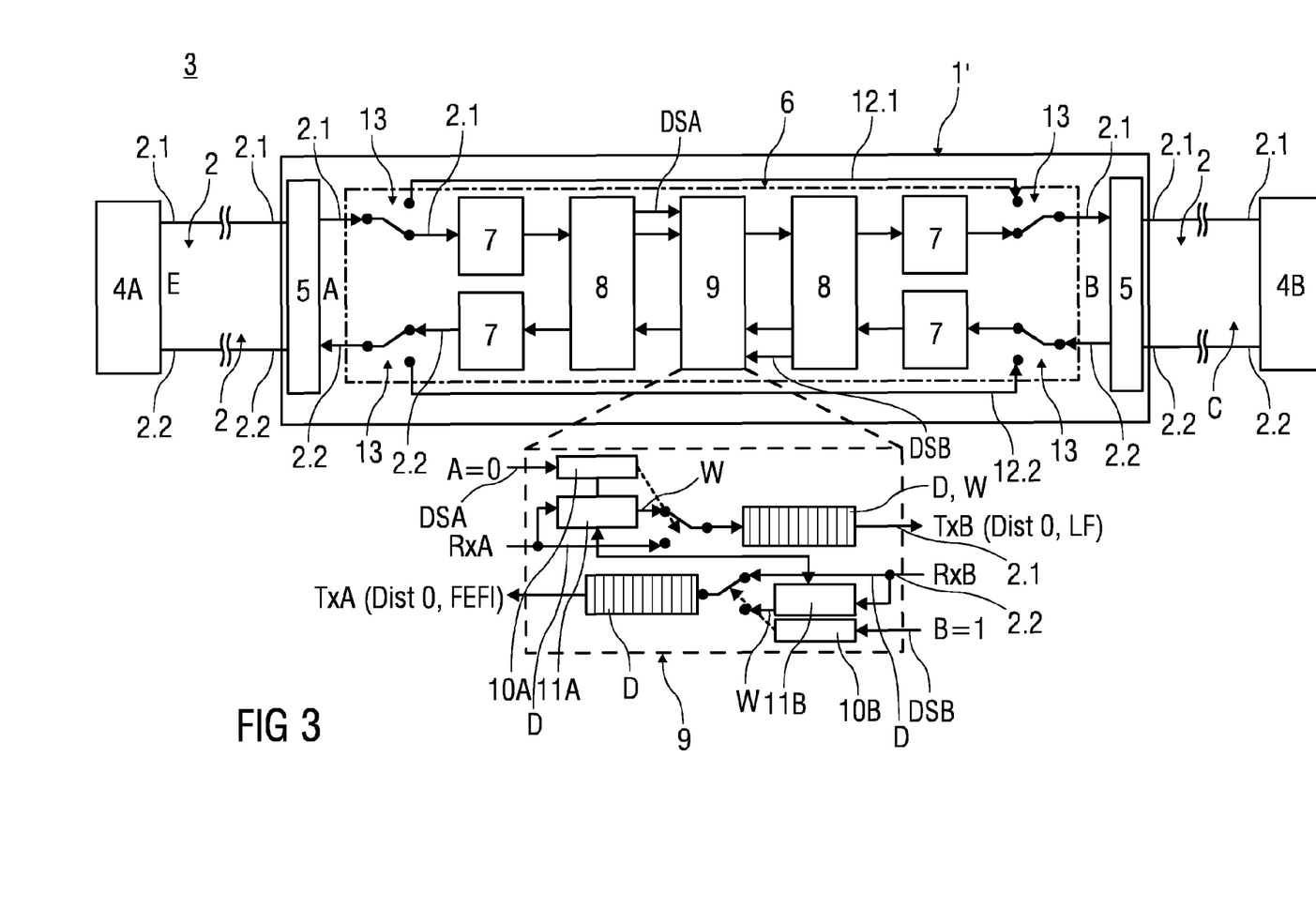
FIG. 3 shows an expansion unit downstream from the expansion unit according to FIG. 1 with a link failure at the expansion unit according to FIG. 1.

FIG. 3 is a schematic block diagram showing the expansion unit 1' downstream from the expansion unit 1 according to FIG. 1 with a link failure at the expansion unit 1 according to FIG. 1.

The downstream expansion unit 1' receives the warning telegrams W with the distance data "Dist 0" and the fault reporting data "LF" identifying a link failure. Both link signals or data signals DSA and DSB are active, with "A=1" and "B=1". The controller 10A that receives the warning telegrams W switches port A into a fault forwarding mode ("panic forward mode"). The received distance data "Dist 0" is increased by the value of "1" and the transmitted warning message W with the distance data "Dist 1" and fault reporting data "LF" is forwarded to the next subsequent network element. The data link to port B operates normally.

If a valid link, or fault-free data connection, is identified at port A by the data signal DSA with the status "A=1", a further predefined number of warning telegrams W with the status "LinkOK" is transmitted. The expansion unit 1, and thus the telegram generators 11A, 11B and the controllers 10A and 10B, are then put into normal operating mode by means of the controller 9. This means that the data telegrams D or the databytes are forwarded by the expansion unit 1 with a certain delay. The expansion unit 1 switches to normal operating mode when the data signals DSA and DSB are active and no more warning telegrams W are being generated.

The link failure originating at port A of the expansion unit 1 in network 3 is forwarded from one network element to the next subsequent network element until the next subsequent network element is a network element with a redundancy function. This network element with a redundancy function automatically switches the network connection over to a fault-free data line.

Figure 4:
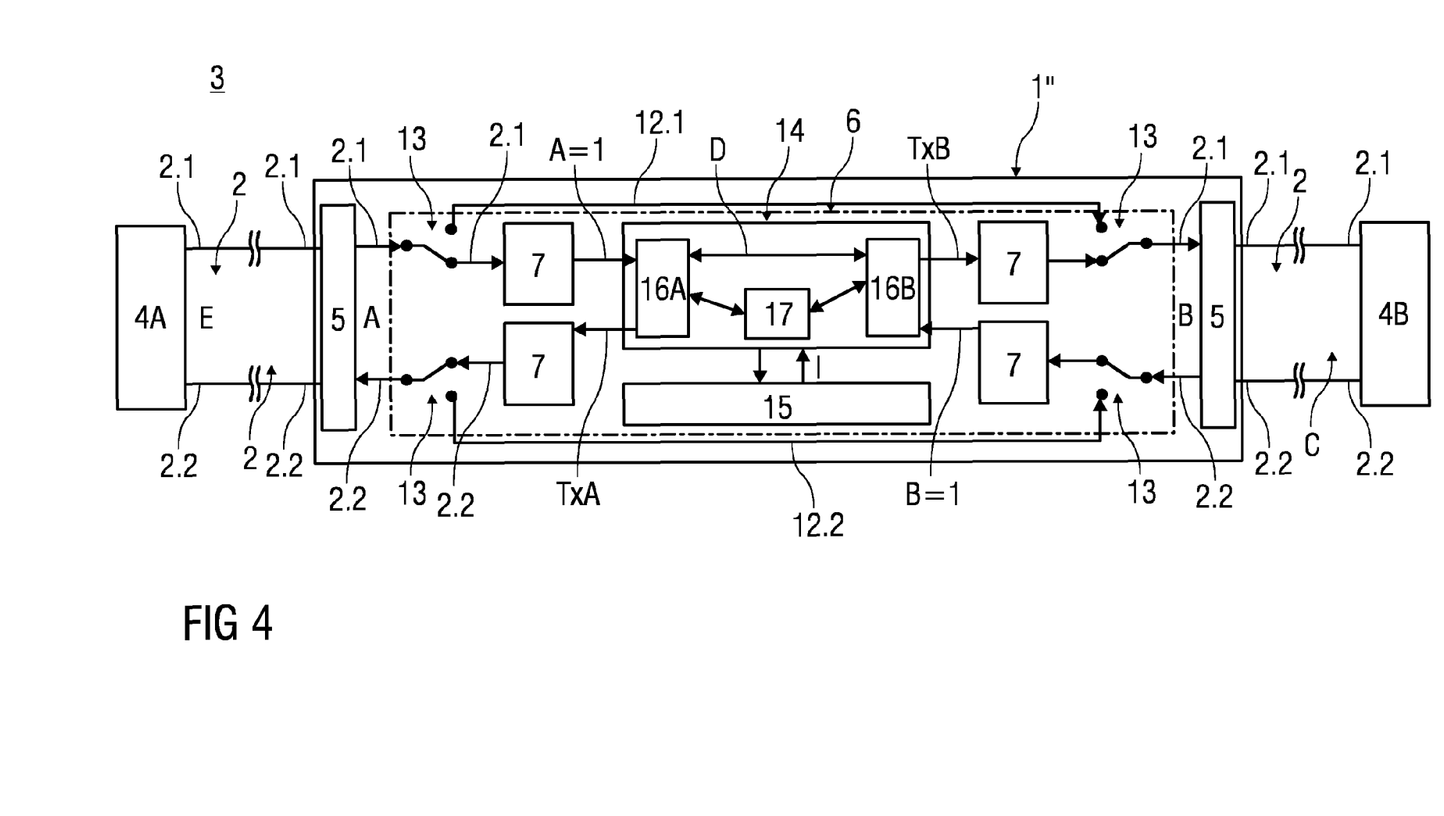
FIG. 4 shows an alternative embodiment of an expansion unit with an Ethernet switch and without a link failure

FIG. 4 is a schematic block diagram showing an alternative embodiment of an expansion unit 1", with a controlled switch/coupling element 14 (also called an Ethernet switch) and without a link failure.

Unlike in the expansion units 1 and 1', the switch/coupling element 14, which is controlled by means of a microcontroller 15, is provided instead of the physical layer device 8 and the electronically programmable circuit 9. The switch/coupling element 14 controlled by the microcontroller 15 via an internal port C controls the data traffic between the external ports A and B via data lines 2.1 and 2.2. The microcontroller 15 is connected via an internal port I on the switch/coupling element 14.

The switch/coupling element is a conventional Ethernet switch without redundancy functionality.

In normal mode, data telegrams D are transmitted from port A to port B. The microcontroller 15 continuously monitors the link status with the aid of port-based status registers 16A and 16B, i.e. the data link between network line 2 and its data lines 2.1 and 2.2, at the external ports A and B.

The switch/coupling element 14 is designed in such a way that data transmissions between the external ports A and B and the internal port C can be individually blocked.

Figure 5:
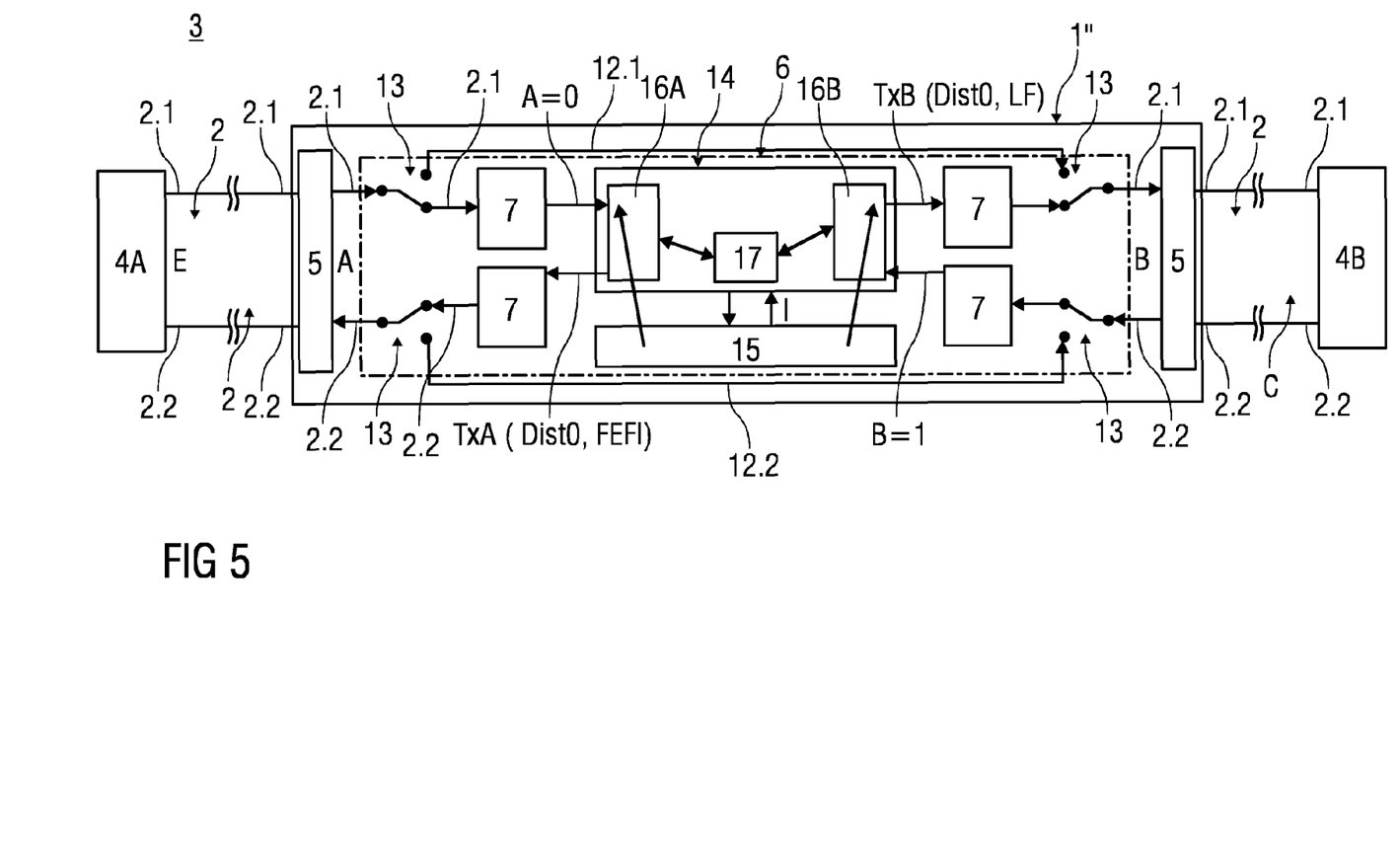
FIG. 5 shows the expansion unit according to FIG. 4 with a link failure.

FIG. 5 is a schematic block diagram showing the expansion unit 1" according to FIG. 4 with a link failure at port A.

The microcontroller 15 identifies the link failure at port A and blocks the data or cross traffic from port A to port B and vice versa. This means that all data telegrams D are processed via the internal port C controlled by the microcontroller 15. Port B of the expansion unit 1 is deactivated.

As an alternative to port deactivation and as in the exemplary embodiment according to FIGS. 1 to 4, the microcontroller 15 generates warning telegrams W as so-called panic telegrams with the distance data "Dist 0" and the fault reporting data "LF" in the path, and with link failure or "FEFI" in the path in the opposite direction.

Figure 6:
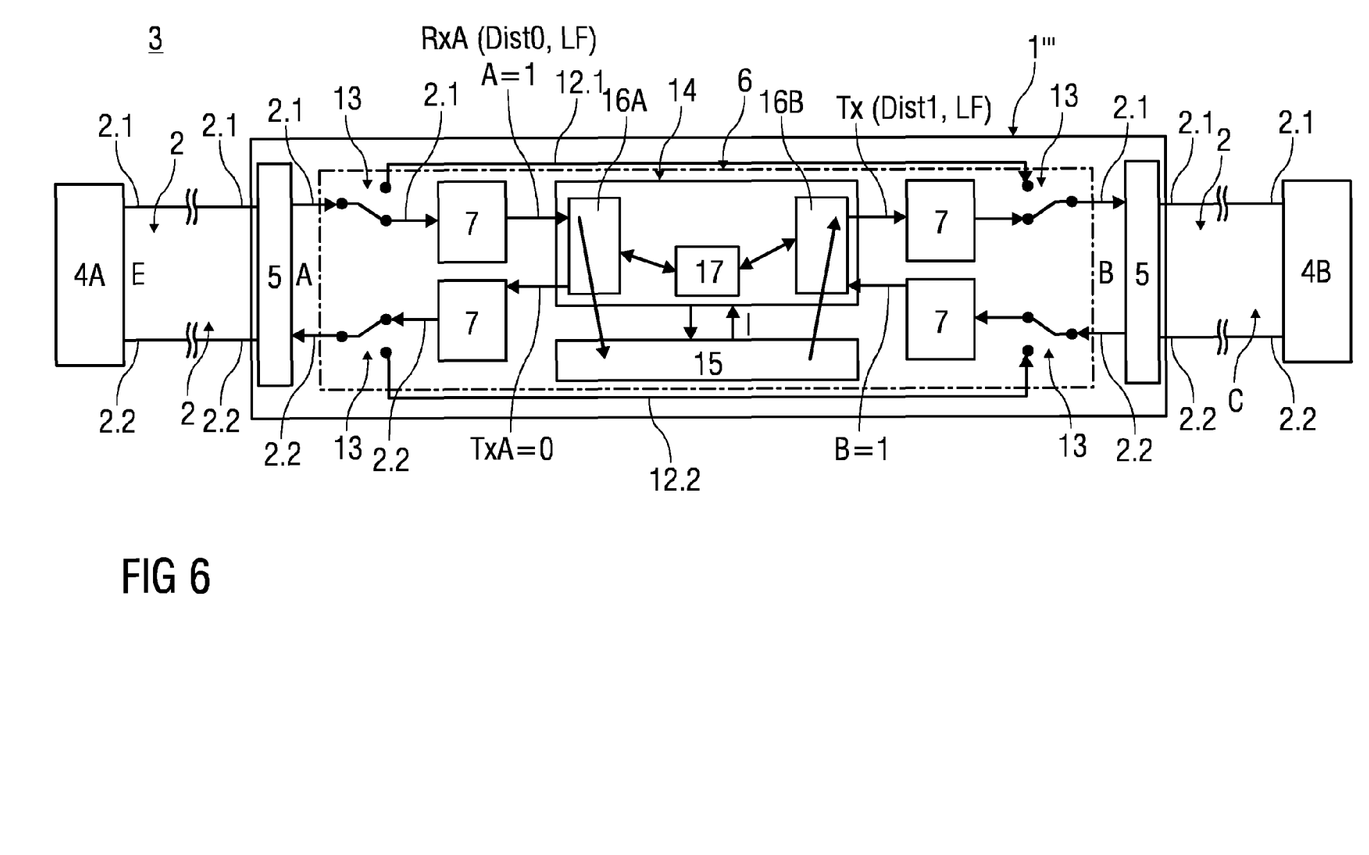
FIG. 6 shows an expansion unit downstream from the expansion unit according to FIG. 4 with a link failure at the expansion unit according to FIG. 4.

FIG. 6 is a schematic block diagram showing an expansion unit 1''' downstream from the expansion unit 1" according to FIG. 4, with a link failure at port A of the expansion unit 1" according to FIG. 4.

As in the exemplary embodiment according to FIGS. 1 to 4, the microcontroller 15 receives the warning telegrams W from the upstream expansion unit 1" received at port A. The microcontroller 9 blocks the direct data traffic from port A to port B and vice versa. The data telegrams D are now only processed via the internal port C of the microcontroller 15.

The microcontroller 15 transmits warning telegrams W with changed distance data, "Dist 1", and the same fault reporting data, "LF", i.e. the point of origin of the link failure can be identified with the aid of the distance data increased by the value of 1, "Dist 1".

Data telegrams D are no longer sent to port A, but the link remains active (A=1, B=1) for the purpose of forwarding the warning telegrams W.

Alternatively, the warning telegrams W are not forwarded, as they have an IP Multicast address. In such cases the microcontroller 15 identifies a link failure and forwards it.

In a redundancy unit of one of the network elements, the warning functions in the event of a link failure operate in the same way, so that the link failure and its point of origin are identified automatically.

The expansion unit 1 can be designed for data transmission both on layer 1 and on layer 2 of the ISO/OSI reference model. The possibilities described here, of forwarding a link failure by the deactivation of ports and the generation of warning telegrams W, are realized in exactly the same way.

The invention claimed is:

1. A network, comprising:
a network transmission line;
at least two network components interconnected by means of said network transmission line;
at least one expansion unit having two external ports and disposed in said network transmission line for extending a scope of said network transmission line, said expansion unit forwarding a failure of said network transmission line at one of said external ports to an external port of a next subsequent network component, and one of said network components receiving a warning telegram generating at least one further warning telegram with fault position identification and sending the at least one further warning telegram to external ports of downstream network elements; and
wherein in an event of the failure of said network transmission line at one of said external ports of said expansion unit, the other of said external ports can be deactivated.

2. The network according to claim 1, further comprising a hard-wired connection circuit, said external ports of said expansion unit are connected to one another by means of said hard-wired connection circuit.

3. The network according to claim 1, wherein said expansion unit has an electronically programmable circuit.

4. The network according to claim 1, wherein said expansion unit can be supplied with electrical energy via said network transmission line.

5. The network according to claim 1, wherein the network is an Ethernet network.

6. A network, comprising:
a network transmission line;
at least two network components interconnected by means of said network transmission line;
at least one expansion unit having two external ports and disposed in said network transmission line for extending a scope of said network transmission line, said expansion unit forwarding a failure of said network transmission line at one of said external ports to an external port of a next subsequent network component, and one of said network components receiving a warning telegram generating at least one further warning telegram with fault position identification and sending the at least one further warning telegram to external ports of downstream network elements; and
wherein said expansion unit having physical layer devices, in an event of the failure of said network transmission line at one of said external ports of said expansion unit the other of said external ports can be deactivated such that an associated said physical layer device of said failed external port is one of switched off or put into a sleep mode.

7. The network according to claim 6, further comprising a hard-wired connection circuit, said external ports of said expansion unit are connected to one another by means of said hard-wired connection circuit.

8. The network according to claim 6, wherein said expansion unit has an electronically programmable circuit.

9. The network according to claim 6, wherein said expansion unit can be supplied with electrical energy via said network transmission line.

10. The network according to claim 6, wherein the network is an Ethernet network.

11. A network, comprising:
a network transmission line;
at least two network components interconnected by means of said network transmission line;
at least one expansion unit having two external ports and disposed in said network transmission line for extending a scope of said network transmission line, said expansion unit forwarding a failure of said network transmission line at one of said external ports to an external port of a next subsequent network component, and one of said network components receiving a warning telegram generating at least one further warning telegram with fault position identification and sending the at least one further warning telegram to external ports of downstream network elements; and
wherein in an event of the failure of said network transmission line at one of said external ports of said expansion unit, said expansion unit switches the other of said external ports in an opposite direction, into a predefined fault mode, and generating the at least one warning telegram, which said expansion port sends to the external ports of the network components that are downstream from said external port in the opposite direction.

12. The network according to claim 11, further comprising a hard-wired connection circuit, said external ports of said expansion unit are connected to one another by means of said hard-wired connection circuit.

13. The network according to claim 11, wherein said expansion unit has an electronically programmable circuit.

14. The network according to claim 11, wherein said expansion unit can be supplied with electrical energy via said network transmission line.

15. The network according to claim 11, wherein the network is an Ethernet network.

16. An expansion unit for extending a scope of a network transmission line in a network, the expansion unit comprising:
    a hard-wired connection circuit;
    at least two ports interconnected by means of said hard-wired connection circuit such that a failure of the network transmission line at one of said ports can be detected and transmitted;
    separating elements, one of said separating elements disposed on an input side and on an output side in each of data lines of the network transmission line; and
    bypass lines, one of said bypass lines disposed on said input side and one said output side, parallel with each of the data lines.

17. The expansion unit according to claim 16, further comprising:
    an electronically programmable circuit; and
    two physical layer devices having said electronically programmable circuit disposed between them, said two physical layer devices connected between said separating elements.

18. The expansion unit according to claim 17, wherein said electronically programmable circuit has a telegram generator and a controller for each of the data lines.

19. The expansion unit according to claim 16, further comprising switching elements, one of said switching elements disposed on said input side and on said output side, between the data lines and said bypass lines.

20. A method for operating a network, including an Ethernet network, the network having at least two network components interconnected by means of a network transmission line, and at least one expansion unit having two external ports and disposed in the network transmission line for extending the scope of the network transmission line, which comprises the steps of:
    forwarding, via the expansion unit, a notice of a failure of the network transmission line via one of the external ports to an external port of a next subsequent network component by generating at least one warning telegram, which the expansion unit sends to the external ports of downstream network components;
    generating, in the downstream network component receiving the warning telegram, at least one further warning telegram with fault position identification and sending the at least one further warning telegram to ports of further downstream network elements; and
    wherein in an event of the failure of the network transmission line at one of the external ports of the expansion unit, deactivating the other of the external ports.

21. A method for operating a network, including an Ethernet network, the network having at least two network components interconnected by means of a network transmission line, and at least one expansion unit having two external ports and disposed in the network transmission line for extending the scope of the network transmission line, which comprises the steps of:
    forwarding, via the expansion unit, a notice of a failure of the network transmission line via one of the external ports to an external port of a next subsequent network component by generating at least one warning telegram, which the expansion unit sends to the external ports of downstream network components;
    generating, in the downstream network component receiving the warning telegram, at least one further warning telegram with fault position identification and sending the at least one further warning telegram to ports of further downstream network elements; and
    wherein the expansion unit having physical layer devices, in an event of the failure of the network transmission line at one of the external ports of the expansion unit the other of the external ports can be deactivated such that an associated physical layer device of the failed external port is one of switched off or put into a sleep mode.

22. A method for operating a network, including an Ethernet network, the network having at least two network components interconnected by means of a network transmission line, and at least one expansion unit having two external ports and disposed in the network transmission line for extending the scope of the network transmission line, which comprises the steps of:
    forwarding, via the expansion unit, a notice of a failure of the network transmission line via one of the external ports to an external port of a next subsequent network component by generating at least one warning telegram, which the expansion unit sends to the external ports of downstream network components;
    generating, in the downstream network component receiving the warning telegram, at least one further warning telegram with fault position identification and sending the at least one further warning telegram to ports of further downstream network elements; and
    wherein in an event of the failure of the network transmission line at one of the external ports of the expansion unit, the expansion unit switches the other of the external ports in an opposite direction, into a predefined fault mode, and generating the at least one warning telegram, which the expansion port sends to the external ports of the network components that are downstream from the external port in the opposite direction.

* * * * *